3,721,492
ELECTROMAGNETIC SHUTTER RELEASE FOR CONTINUOUS OPERATION AND SINGLE-FRAME OPERATION IN MOTION PICTURE CAMERAS
Arthur Kessler, Koppern, Germany, assignor to Ernst Leitz GmbH, Wetzlar, Germany
Filed Mar. 1, 1972, Ser. No. 230,767
Claims priority, application Germany, Mar. 22, 1971, P 21 13 789.3
Int. Cl. G03b 21/32
U.S. Cl. 352—137          5 Claims

ABSTRACT OF THE DISCLOSURE

A motion picture camera wherein the rotating shutter and the film advance mechanism are driven by an electric motor for optionally releasing the shutter for continuous operation or for single frame exposure. A bi-stable circuit is provided in series with the camera release switch, the circuit being switched to its conductive state when the camera release switch is closed. The bistable circuit controls a solenoid which releases the shutter for rotation when the bistable circuit is conductive. A series of cams on the shutter shaft operates a series of switches for controlling the bistable circuit and the solenoid to secure either continuous operation or time exposures.

BACKGROUND OF THE INVENTION

The field of the invention is motion picture cameras with single frame operation.

The invention is particularly related to an electromagnetic shutter release for continuous operation and single-frame operation in motion picture cameras driven by an electric motor, wherein a spring-loaded stop member is provided for the rotating shutter. Upon the release of the camera shutter, the member is moved by a solenoid against the spring bias out of the rotational path of the shutter. A bi-stable circuit is connected behind the switch actuated by the camera shutter release and this circuit flips into its conductive switching position upon the actuation of the shutter release. The solenoid is connected to a current only when the shutter release is actuated and the bi-stable circuit is in its conductive switching position, and wherein means are provided which feed a pulse derived from the rotating shutter shaft to the bi-stable circuit when it is set for single-frame operation. This pulse flips the circuit, after one rotation of the shutter shaft, into its non-conductive switching position as disclosed in U.S. Pat. No. 3,601,481 of Kessler, which issued Aug. 24, 1971.

The single-frame shutter release as disclosed in the aforementioned patent is constructed so that, upon depression of the camera shutter release, a length of film is transported which corresponds approximately to the height of one frame plus the height of one perforated edge, and this one frame is exposed during this step. Exposure takes place in the exposure time of about $\frac{1}{40}$ sec. which, in the case of moving pictures, results in a standard exposure frequency of 18 frames per second.

On many occasions where the taking of single pictures is required under unfavorable conditions, the exposure time proves to be too short. Rather, in these cases it would be advantageous if it were possible to take individual pictures with the time-exposure time set as in still cameras, i.e. if a device were provided at the motion picture camera permitting the opening of the film aperture by pressure on the shutter release and to close the film aperture again by exerting pressure a second time, and at the same time advance the film. The time between the first shutter actuation and the second shutter actuation must be freely selectable, as is the case in still cameras.

SUMMARY OF THE INVENTION

Therefore, the present invention is based on the problem of further developing the shutter release device disclosed in U.S. Pat. No. 3,601,481 and of further improving the camera so that time-exposure times are possible in single-frame exposures.

According to the present invention, this problem is solved by providing means which apply a further stopping pulse to the bistable circuit which is shifted by about 180° with respect to the first stopping pulse and is likewise derived from the rotating shutter shaft, to flip the circuit into its nonconducting switching position; and by providing additional means which prevent the further stopping pulse from flipping the bi-stable circuit into its nonconducting switch position, to maintain the solenoid under current when the camera is adjusted to single-frame exposure during normal operation.

Accordingly, the invention comprises flipping the bistable circuit into its nonconducting switching position not only after the completion of an entire revolution of the shutter shaft by means of a stipping pulse triggered by the shaft, and thus to deenergize the solenoid with the stop member and thus to stop the shutter, but to effect this procedure after one-half a rotation of the shutter shaft, in addition to the above. After one-half revolution, the open sector of the shutter is disposed exactly in front of the image aperture, so that the exposure can be prolonged as desired. At the end of the desired exposure time, a second pressure on the shutter release then triggers the rotary shutter again, the shaft executes one-half a rotation and thus closes the image aperture again. By respectively actuating the release twice when the camera is set to single-frame operation, the operator can therefore adapt the exposure time of the single-frame individually in accordance with the given lighting conditions.

Of course, in the camera constructed according to the present invention, the possibility of exposing single-frames by one-time shutter release actuation with the frequency-dependent exposure time of about $\frac{1}{40}$ sec. of the prior art must not be impaired by the improvements. Therefore, additional elements are necessary and are also provided, by means of which the stopping pulses fed to the bi-stable circuit after a 180° revolution of the shutter shaft can be rendered ineffective.

In a practical embodiment, the means by which the additional stopping pulse is fed to the bi-stable circuit after a 180° revolution of the shutter shaft consists of a second cam on the shutter shaft, and this second cam is offset by 180° with respect to the first cam, already disclosed as the prior art in U.S. Pat. No. 3,601,481, for stopping the rotation of the shutter after one revolution. This second cam likewise engages the pulse generating switch disclosed in U.S. Pat. No. 3,601,481 and this switch is now actuated at twice the frequency. Furthermore, a second stop member is disposed at the rotary shutter shaft fixedly connected therewith, respectively, behind which the solenoid actuated stop member of the camera can engage and stop the shutter also after a 180° rotation of the shutter.

The means by which the 180° stopping pulse is rendered ineffective whenever single-frame exposures are to be made at the frequency-dependent exposure time, rather than at a time-exposure time, consist of a parallel branch to the bi-stable circuit from the current source directly to the solenoid. In this parallel circuit, two operating contacts are installed in series, one of which can be selectively closed and opened by the operator, whereas the second cooperates with a further cam fixed arranged at the shutter shaft and this cam closes the second contact whenever the shutter is in its open position.

Current is constantly applied to the solenoid via the parallel circuit and, besides, the bi-stable circuit cannot flip into its nonconducting condition when the parallel circuit is closed. In contrast thereto, if the parallel circuit is interrupted, for example by one of the operating switches, opened by the operator, then the stopping pulses derived from the rotating shutter shaft become fully effective, i.e. the shutter shaft is stopped after each 180° revolution. This is the condition of single-frame operation and time-exposure.

However, if the operating switch in the parallel circuit, accessible to the operator, is closed, then the solenoid is retained via this circuit, and the bi-stable circuit is prevented from flipping into its nonconducting condition, which would otherwise have been caused by the 180° stopping pulse. Therefore, the shutter now passes the 180° position until, in the 360° position, the second switch present in the parallel circuit is opened by a cam fixedly mounted on the shutter shaft. Only at this time, i.e. after one full revolution, is the rotation of the shutter shaft stopped. Upon being released again, the shaft completes one revolution and then is stopped. In this manner, the prior art function is preserved in a camera equipped, according to the present invention, for time-exposure of single frames.

Of course, when the person using the camera makes single-frame pictures with time-exposure, it is somewhat inconvenient to have to actuate the release twice for each picture, once for opening the shutter and again to close it. Therefore, it is furthermore suggested to construct the selector switch between the frequency-dependent exposure and the time-exposure as a double-throw switch which can be switched over between two branches. In one branch, as described above, the switch is closed exactly at 180° and thus makes the 180° stopping pulse ineffective, and in the other branch, the switch is closed, by a cam fixedly attached to the shutter shaft, in each case exactly in the 0° or 360° position and thus the 360° stopping pulse is rendered ineffective.

The shutter shaft cannot be arrested after one full revolution (=closed position of the shutter). Rather, the shutter must execute another one-half rotation and run into the open position. Therefore, for the time-exposure, respectively one release actuation is necessary in each case.

For the user who makes single-frame exposures, it is, of course, important to know whether the shutter is disposed at that instant in its open position or in its closed position. This was no problem in the cameras according to the prior art, since the shutter could rotate only from the closed position into the next closed position even in single-frame exposures. Therefore, at the rest position of the cameras, there was always the certainty that the image aperture was closed. This, by the way, holds also true for the camera of the present invention in the case where the individual frames are exposed in the camera by means of the frequency-dependent exposure, rather than by time-exposure.

During time-exposure operation, namely when the shutter release is not switched so that the rotating shutter passes from the open position to the open position, it may, however, be doubtful to an operator whether the image aperture is open or closed at that particular instant. Therefore, according to the present invention, an indicating device is provided which indicates the position of the rotating shutter, be it open or be it in the closed position. This indicating device consists of a light source, preferably a gallium-arsenide-phosphite diode which is connected, on the one hand, directly to the power source, but on the other hand, in the parallel circuit between the operating switch accessible to the operator and the second switch inserted therein. Since this second switch is closed in each case in the 180° position of the shutter, the light source is thus illuminated in this position and consequently indicates to the user that the image aperture is open.

BRIEF DESCRIPTION OF THE DRAWINGS

This invention is illustrated in one embodiment of the drawings, to wit.

BRIEF DESCRIPTION OF THE PREFERRED EMBODIMENTS

Figure 1:
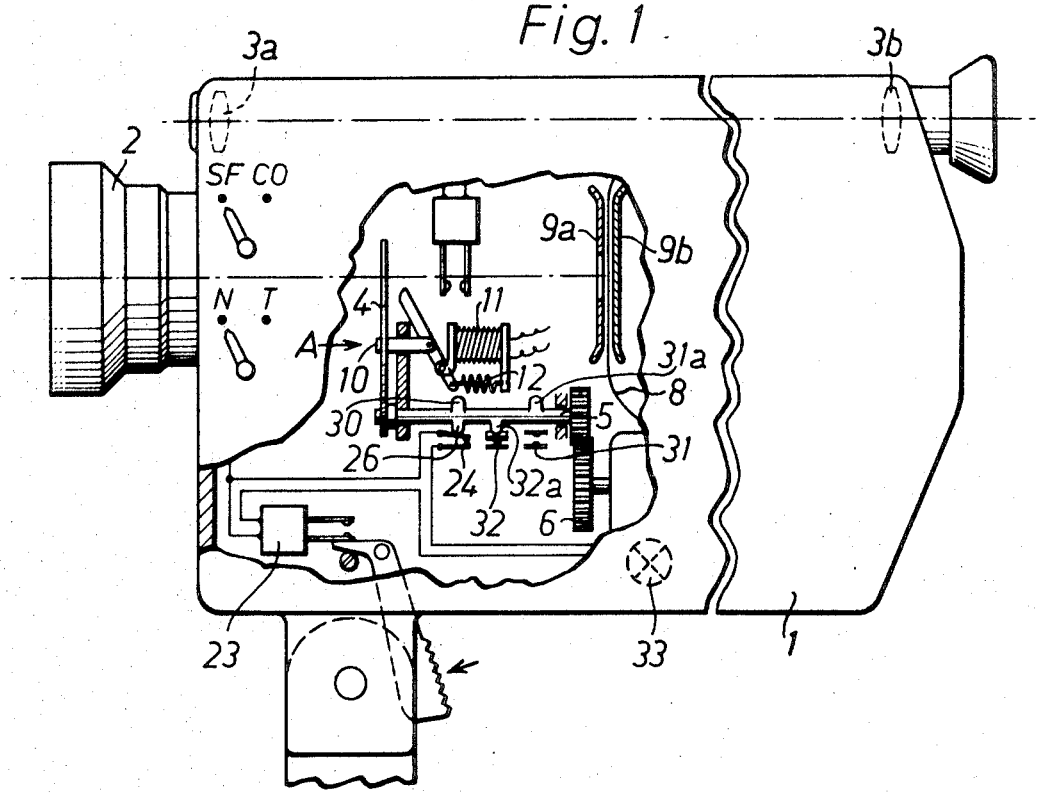
FIG. 1 is a schematic view of a motion picture camera with a solenoid, a stop member, and a pulse generating switch in combination with a rotating shutter.

In FIG. 1, numeral 1 denotes the housing of a motion picture camera, carrying the objective 2 at its front side. Furthermore, the camera comprises a direct viewfinder 3a, 3b and, in the interior of the housing, a rotating shutter 4 on a shaft 5. The latter is driven by an electric motor via gear 6. A film 8 is guided between an image aperture plate 9a and a pressure plate 9b from a supply reel, which is not shown, to a take-up reel, which is likewise not illustrated. The film advance means are not indicated, either, in order to simplify the illustration.

In the path of rotation of the shutter 4, a stop member 10 is disposed which is movable in the direction of arrow A to trigger the camera. The stop lever is attached to the armature of a solenoid 11 which latter, during current flow, attracts the armature against the bias of the spring 12 and pulls the stop member out of the path of rotation of the shutter during this step.

Figure 2:
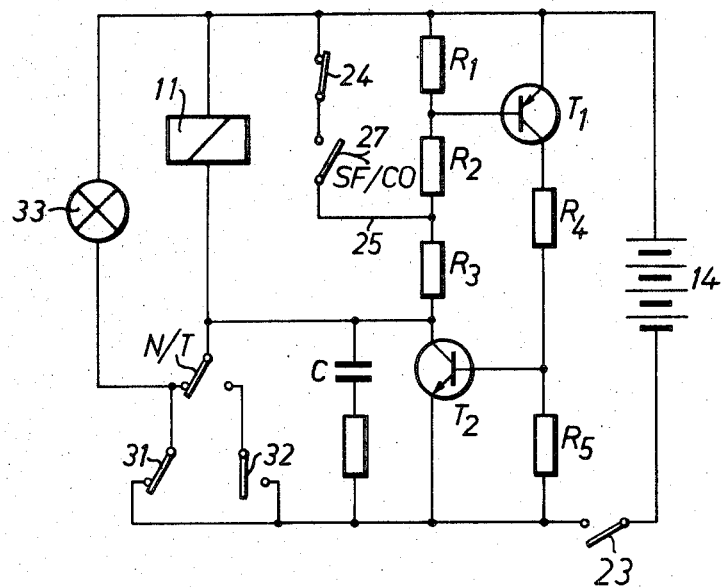
FIG. 2 shows the circuit of a shutter release device for continuous operation and for single-frame exposure using a bistable flip-flop stage.

The circuit of the solenoid 11 can be seen from FIG. 2, wherein it is indicated that the shutter release comprises a bi-stable circuit consisting of two complementary transistors $T_1$ and $T_2$, as well as of the resistors $R_1$, $R_2$, $R_3$, $R_4$, and $R_5$. Furthermore included are a capacitor C and a shutter release switch 23. When the latter is closed, the capacitor C is charged, whereby the two transistors $T_1$ and $T_2$ become conductive, and the solenoid 11 is energized. The power source is denoted by 14.

A pulse generating switch 24 is provided as the actual setting and switching device for single-frame and continuous operation. On one side, this pulse generating switch is connected, via a set switch 27, to the power source 14 and, on the other side, via a lead line 25, with the bi-stable flip-flop stage. This device is effective on the feedback circuit of the bi-stable flip-flop stage. The pulse generating switch 24 is engaged by a cam 26 mounted on the shoulder of shaft 5 of the shutter 4 so that the switch 24 is closed once per revolution of the shutter.

The feedback circuit can be short-circuited by means of the setting switch 27 and the switch 24. The switch 27 is accessible from the outside of the camera housing 1 by a knob or handle having the markings "Single Frame" and "Continuous Operation" (SF/CO) for two positions of adjustment so that the contact 24 is ineffective when the switch stands at CO, but is effective when the switch is at SF and thus, upon closing of the switch 24, the feedback circuit of the flip-flop is short-circuited.

This apparatus has been disclosed in U.S. Pat. 3,601,481 and is used for the exposure of single-frames with a frequency-dependent exposure time.

Figure 3A:
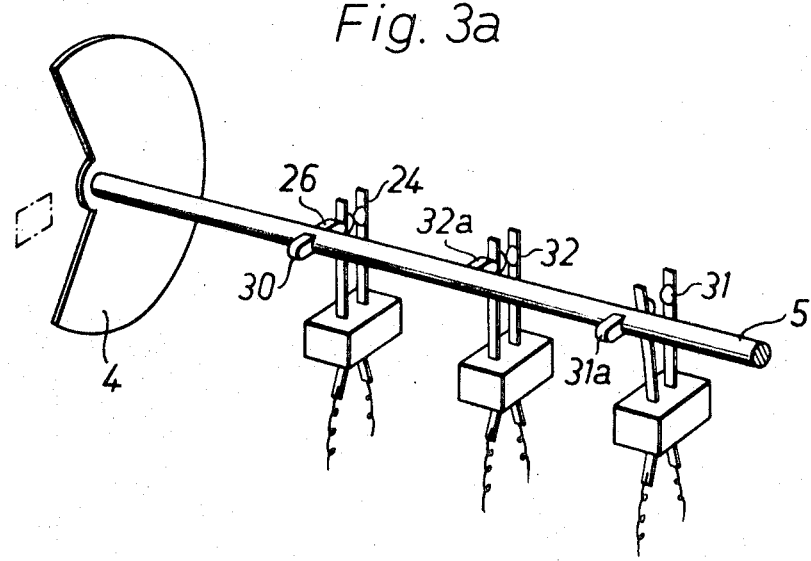
FIG. 3a is a schematic view of the rotating shutter and the shutter shaft, where cams are disposed on the shutter shaft, and switches are actuated by these cams.

In order to effect single-frame exposures with a time-exposure time, according to the present invention, the following switching elements are additionally provided: First of all, the shutter shaft is equipped with another cam 30 (FIG. 3a), displaced by 180° with respect to the cam 26. By this additional cam, the pulse generating switch 24 is now also actuated when the image aperture has just been uncovered by the shutter. Then, the image aperture remains open for a period of time (time-exposure) until the camera release is again actuated, i.e. the switch 23 is again closed. For this purpose, a further mechanical member is arranged at the shutter at the shutter shaft, respectively, behind which the stop member 10 engages also in the 180° position of the shutter.

In order to also obtain the additional possibility of making individual pictures exposed in a frequency-dependent manner, and in order to furthermore avoid the repeated actuation of the shutter release in the case of single-frame exposures with time-exposure, the following elements are added: A circuit is connected in parallel to the output of the bi-stable circuit, this circuit consisting of two branches with an interposable reversing switch N/T. Furthermore, a switch 31 is arranged in one branch, and a switch 32 is connected in the other branch. Two cams 31a and 32a disposed on the shutter shaft engage these switches. The operation is such that the cam 31a closes the switch 31 when the shutter has completed one-half a rotation, i.e. in the 180° position of the shutter, whereas the cam 32a closes the switch 32 after each 360° revolution of the shutter. By means of the reversing switch N/T the operator, after preselecting at the selector contact SF/CO whether he wishes to take a series of pictures or individual frames, can now also preselect, in case of an adjustment to a single frame (=SF=contact closed), whether he intends to take the individual frames with the exposure time resulting from the image frequency, or whether he wishes to take them with a time-exposure.

The operation in this connection, is as follows:

When the reversing switch is set to N (=normal exposure dependent on exposure frequency), the branch with switch 31 is included in the circuit parallel to the bi-stable circuit, and this switch 31 is closed by its cam 31a in each 180° rotation of the shutter. Once the operator actuates the shutter release of the camera, the pulse generating switch 24 is closed by the cam 30 after a shutter revolution of 180° and thus a stop pulse is produced. However, since the switch 31 is closed simultaneously, the solenoid 11 remains energized and furthermore the bi-stable circuit cannot flip into its nonconducting condition as a result of the given stop pulse. Therefore, the shutter shaft and the shutter continue to rotate until the cam 26 closes the pulse generating switch 24 for the second time, which is the case after a full revolution of the shutter. At this instant, the switch 31 is open, so that the presently emitted stop pulse results in the flipping of the bi-stable circuit into its nonconducting state and thus in the deenergizing of the solenoid 11 and in the stopping of the rotating shutter.

If the operator desires a time-exposure for his single-frame pictures, he switches the reversing switch N/T to T and thus includes the switch 32 in the circuit parallel to the bi-stable circuit. As mentioned above, the switch 32 is closed by the associated cam 32a whenever the shutter has completed a full rotation. Thereby, the following operation results:

The operator closes the shutter release switch 23, the shutter begins to rotate and is stopped, after a rotation of 180°, with the image aperture open, because the cam 30 has closed the pulse generating switch 24 and simultaneously the switch 32 is open, i.e. the parallel circuit is interrupted. The stop pulse thus becomes fully effective, and the shutter is arrested. Now, the operator has time to keep the image aperture open for as long a period of time as he deems appropriate in view of the given object brightness. Only when he closes the shutter release switch 23 again does the shutter resume its rotation. After another 180° of rotation of the shutter, the pulse generating switch 24 is closed again, this time by the cam 26. However, since the switch 32 is now closed at the same time and the cam 32a associated therewith always closes the contact in the 0° or 360° position of the shutter, the stop pulse given by the pulse generating switch 24 in combination with the cam 26 does not become effective. Rather, the solenoid 11 remains supplied with current via the reversing switch N/T and the switch 32, and the bi-stable circuit cannot flip over, either. The shutter, rather, continues its rotation until, in the 180° position thereof, the switch 32 is again open so that the stopping pulse given by the pulse generating switch 24 at this point in time, in combination with the cam 30, becomes effective, whereby the bi-stable circuit flips into its nonconducting state, the solenoid 11 is deenergized, and the shutter is arrested. Now, the image aperture is again open. However, to attain this condition, the operator needed to actuate the shutter release only once, which accomplished the rotation of the shutter from the open position to the open position and simultaneously, of course, the transport of the film.

The condition of the camera, namely whether the image aperture is open or closed, can be recognized by the operator due to the light source 33. This light source is connected, on the one hand, between the reversing switch N/T and the switch 31 to the latter and, on the other hand, directly to the power source 14. Accordingly, the light source is always illuminated when the switch 31 is closed, which is always the case in the 180° position of the shutter (=open position). An illuminated light source thus indicates to the operator that the image aperture of the camera is open.

In the case where individual frames are taken in the normal operation, the light source lights up once per frame, and in continuous operation, the light source blinks at the image frequency set on the camera.

Figure 3B:
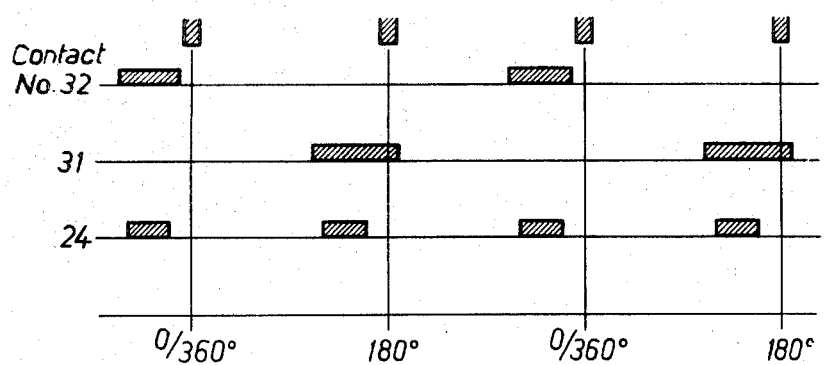
FIG. 3b is a graphic representation of the correlation of the closed position of the switches with the angular position of the rotating shutter.

In FIG. 3b, the correlation of the switches to one another and to the stops of the rotating shutter is illustrated. Two stops are present, namely one at 0/360° and the added stop at 180° of the shutter position. The pulse generating switch 24 is closed upon rotation of the shutter by 360° and now also at each 180° revolution of the shutter. However, this closing does not occur exactly after 180° and/or 360° of shutter rotation, but somewhat prior thereto. This, on the one hand, takes the drop-out time of the relay into consideration and, on the other hand, ensures that this contact, in the stopped position of the shutter, is again opened at exactly 180° and/or 360°, since, if this switch 24 were still closed in the actual stopped position of the shutter, the camera could not be actuated again upon the renewed operation of the shutter release. The switches 31 and 32 overlap, with respect to their closed periods. The switch 24 is in contact in both directions, whereby the switch 31 is closed somewhat beyond the exact 180° position.

What is claimed is:

1. In a shutter release device in a motion picture camera wherein the rotating shutter means and the film advance means are driven by an electric motor for optionally releasing the shutter for continuous operation or for single frame exposure having;
   (a) a stop member (10) for stopping and releasing said rotating shutter means;
   (b) an electric camera release switch (23);
   (c) a bi-stable circuit in series with said camera release switch, said circuit being switched to its conductive state when said camera release switch is closed;
   (d) a solenoid (11) for withdrawing said stop member from the shutter and thereby releasing the latter when said solenoid is energized, said solenoid being energized only when said camera release switch is closed and said bi-stable circuit is in its conductive state;
   (e) first means (24, 26) for generating and conducting a first electric pulse to said bi-stable circuit in dependence on each revolution of the shutter;

(f) setting means (27) for optionally setting the device to continuous operation or to single frame exposure, said setting means functionally connected to said first pulse generating means so that said first pulse switches said bi-stable circuit to its nonconductive state when said setting means are set to single frame exposure, while said first pulse is prevented from switching the circuit to its nonconductive state when the setting means are set to continuous operation;

the improvement for effecting time-exposure of single frames comprising:

(g) second means (24, 30) for generating and conducting a second electric pulse to said bi-stable circuit at an angle of 180° to the first means so that said second pulse switches the bi-stable circuit to its nonconductive state; and (h) third means (31, 31a) for generating and conducting a third electric pulse to said bi-stable circuit at an angle of 180° to said first means so that said third pulse cancels said second pulse, said bi-stable circuit remains conductive, and said solenoid is energized.

2. The shutter release device of claim 1, wherein said rotating shutter means include a shaft, said first means comprise a first cam (26) mounted on said shaft and a first switch (24), said second means comprise a second cam (30) mounted on said shaft displaced 180° from said first cam and said first switch (24), said third means comprise a third cam (31a) mounted on said shaft displaced 180° from said first cam and a second switch (31) connected to said solenoid (11), and an operating contact (N/T) connected to said third switch.

3. The shutter release device of claim 2, wherein means are provided for rendering ineffective the pulse from said first switch (24) when the camera is set to single-frame operation with time-exposure comprising a first branch circuit and a second branch circuit connected to said solenoid (11), said operating contact (N/T) connecting said branch circuits, said second switch (31) in said first branch and a third switch (32) in said second branch, said third switch engaged by a fourth cam (32a) mounted on said shaft parallel to said first cam to activate said third switch when said shutter means is in the closed position.

4. The shutter release device of claim 3, wherein means are provided to indicate the open position of said shutter means.

5. The shutter release device of claim 4, wherein said indicating means is a light source (33) connected to a power source (14) and in a parallel circuit to said bi-stable circuit between said operating contact (N/T) and said second switch (31).

References Cited

UNITED STATES PATENTS 3,601,481  8/1971  Kessler _____ 352—169

SAMUEL S. MATTHEWS, Primary Examiner

M. H. HAYES, Assistant Examiner

U.S. Cl. X.R.

352—169